US012756277B2

(12) United States Patent
Jin et al.

(10) Patent No.: US 12,756,277 B2
(45) Date of Patent: Oct. 6, 2026

(54) MOTOR CONTROL UNIT, ELECTRIC DRIVE ASSEMBLY AND VEHICLE

(71) Applicant: Xiaomi EV Technology Co., Ltd., Beijing (CN)

(72) Inventors: Yongming Jin, Beijing (CN); Chunfu Shi, Beijing (CN); Jiuhui Wang, Beijing (CN); Sheng Ye, Beijing (CN); Weixing Liu, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 214 days.

(21) Appl. No.: 18/650,656

(22) Filed: Apr. 30, 2024

(65) Prior Publication Data

US 2025/0088079 A1 Mar. 13, 2025

(30) Foreign Application Priority Data

Sep. 11, 2023 (CN) ......................... 202311170366.9

(51) Int. Cl.

*H02K 11/33* (2016.01)
*H02K 9/19* (2006.01)
*H02K 11/02* (2016.01)

(52) U.S. Cl.

CPC ............... *H02K 11/33* (2016.01); *H02K 9/19* (2013.01); *H02K 11/02* (2013.01); *H02K 2211/03* (2013.01)

(58) Field of Classification Search

CPC .......... H02K 9/19; H02K 11/02; H02K 11/33; H02K 2201/03
USPC ............................................................ 310/54
See application file for complete search history.

(56) References Cited

U.S. PATENT DOCUMENTS 9,413,208 B2 * 8/2016 Pal ............................ H02K 9/18
10,284,047 B2 * 5/2019 Fritts ......................... H02K 9/04
10,595,660 B2 * 3/2020 Patadia ................... A47J 27/04
10,833,552 B2 * 11/2020 Major ................ H01R 13/6215
11,658,545 B2 * 5/2023 Alanis .................... H02K 7/145 310/50

(Continued)

FOREIGN PATENT DOCUMENTS

CN 112994367 A 6/2021
CN 113840504 A 12/2021

(Continued)

OTHER PUBLICATIONS

Liu et al., English Machine Translation of WO-2024036657-A1 (Year: 2024).*

*Primary Examiner* — Rashad H Johnson
(74) *Attorney, Agent, or Firm* — Volpe Koenig

(57) ABSTRACT

A motor control unit, an electric drive assembly and a vehicle. The motor control unit includes a cooling assembly, a power assembly and a filtration assembly, where the cooling assembly includes a box, the box including a cooling portion, a first mounting portion and a second mounting portion, the first mounting portion being on a side of the cooling portion in a first direction, and the second mounting portion being on the other side of the cooling portion opposite the first mounting portion in the first direction. The power assembly is mounted at the first mounting portion, and the filtration assembly is mounted at the second mounting portion, such that the cooling portion simultaneously cools the power assembly and the filtration assembly.

20 Claims, 7 Drawing Sheets

(56) References Cited

U.S. PATENT DOCUMENTS

| | | | | |
|---|---|---|---|---|
| 12,381,441 | B2 * | 8/2025 | Crosson | H02K 9/06 |
| 2012/0103716 | A1 * | 5/2012 | Fujihara | B62J 50/30<br>180/220 |
| 2014/0084719 | A1 | 3/2014 | Asakura et al. | |
| 2016/0226334 | A1 | 8/2016 | Falguier et al. | |
| 2016/0329760 | A1 * | 11/2016 | Major | H02K 15/12 |
| 2017/0012504 | A1 * | 1/2017 | Sever | H02K 15/14 |
| 2017/0288486 | A1 * | 10/2017 | Hoemann | H02K 1/2773 |
| 2018/0309343 | A1 * | 10/2018 | Tolksdorf | H02K 11/33 |
| 2019/0283161 | A1 * | 9/2019 | Yun | B29C 64/245 |
| 2019/0348892 | A1 * | 11/2019 | Aso | H02K 21/16 |
| 2020/0161925 | A1 * | 5/2020 | Maruyama | H02K 7/085 |
| 2020/0177058 | A1 * | 6/2020 | Goto | H02K 9/227 |
| 2020/0350801 | A1 * | 11/2020 | Takahashi | H02K 5/225 |
| 2020/0373867 | A1 * | 11/2020 | Yamashita | B62D 5/0403 |
| 2021/0234423 | A1 * | 7/2021 | Leonardi | B60K 11/02 |
| 2021/0344253 | A1 * | 11/2021 | Eason | H02K 1/223 |
| 2024/0113601 | A1 * | 4/2024 | Yu | H02K 11/33 |
| 2024/0421670 | A1 * | 12/2024 | Sato | H02K 11/40 |
| 2025/0088079 | A1 * | 3/2025 | Jin | H02K 11/33 |

FOREIGN PATENT DOCUMENTS

| | | | | |
|---|---|---|---|---|
| CN | 115431791 | | 12/2022 | |
| EP | 1184905 | A1 | 3/2002 | |
| EP | 4231508 | A1 | 8/2023 | |
| WO | 2023/279940 | Y | 1/2023 | |
| WO | 2023/124681 | A | 7/2023 | |
| WO | WO-2024036657 | A1 * | 2/2024 | B60L 15/20 |

* cited by examiner

MOTOR CONTROL UNIT, ELECTRIC DRIVE ASSEMBLY AND VEHICLE

CROSS REFERENCE TO RELATED APPLICATIONS

The disclosure is proposed on the basis of and claims priority to the Chinese Patent Application No. 202311170366.9, filed on Sep. 11, 2023, and the entire content of which is incorporated herein by reference.

BACKGROUND

As the power density of a motor control unit in a new energy vehicle keeps increasing, growing current output capacity and output power, as well as reduced size and weight, are required. The power density of the motor control unit can be effectively improved by enhancing the integration level and reducing the number of its internal parts, and improving the heat dissipation capacity of its internal heat-sensitive parts (including a direct current bus capacitor, a direct current filtration assembly, and a power assembly).

SUMMARY

The disclosure relates to the technical field of motor control units, in particular to a motor control unit, an electric drive assembly, and a vehicle.

In order to achieve the above objective, a first aspect of the disclosure provides a motor control unit. The motor control unit includes: a cooling assembly including a box, the box including a cooling portion, a first mounting portion and a second mounting portion, the first mounting portion being on a side of the cooling portion in the first direction, and the second mounting portion being on the other side of the cooling portion opposite the first mounting portion in the first direction; a power assembly being on the first mounting portion; and a filtration assembly being on the second mounting portion, the cooling portion being for simultaneous cooling of the power assembly and the filtration assembly.

A second aspect of the disclosure provides an electric drive assembly. The electric drive assembly includes an electric drive housing and the motor control unit. The motor control unit includes: a cooling assembly including a box, the box including a cooling portion, a first mounting portion and a second mounting portion, the first mounting portion being on a side of the cooling portion in the first direction, and the second mounting portion being on the other side of the cooling portion opposite the first mounting portion in the first direction; a power assembly being on the first mounting portion; and a filtration assembly being on the second mounting portion, the cooling portion being for simultaneous cooling of the power assembly and the filtration assembly.

A third aspect of the disclosure further provides a vehicle. The vehicle includes the electric drive assembly; the electric drive assembly including an electric drive housing and the motor control unit. The motor control unit including: a cooling assembly including a box, the box including a cooling portion, a first mounting portion and a second mounting portion, the first mounting portion being on a side of the cooling portion in the first direction, and the second mounting portion being on the other side of the cooling portion opposite the first mounting portion in the first direction; a power assembly being on the first mounting portion; and a filtration assembly being on the second mounting portion, the cooling portion being for simultaneous cooling of the power assembly and the filtration assembly.

Other features and advantages of the disclosure will be described in detail in the following detailed description.

BRIEF DESCRIPTION OF DRAWINGS

The accompanying drawings are used for providing further understanding of the disclosure as a constituent part of the description, serve to explain the disclosure together with the following specific embodiments, but do not constitute a limitation to the disclosure.

DETAILED DESCRIPTION

The particular embodiments of the disclosure are described in detail below with reference to accompanying drawings. It should be understood that the particular embodiments described here are merely used to explain the disclosure, rather than limit the disclosure.

In the disclosure, unless otherwise stated, orientation words such as "up, down, left and right" usually refer to the up, down, left and right of the corresponding drawings; orientation words such as "inside and outside" are relative to outlines of corresponding parts; and in the accompanying drawings, X denotes a first direction, Y denotes a second direction and Z denotes a third direction. In addition, the terms "first" and "second" used in the disclosure are used to distinguish one element from another, but do not indicate sequence or importance. When the following description involves the accompanying drawings, the same numerals in different accompanying drawings indicate the same or similar elements unless otherwise indicated.

In the related art, all internal parts are independent and distributed on the front of a liquid-cooled case according to the structural design scheme of the motor control unit. In a current flow direction in the control unit, an input filtration assembly, a direct current bus capacitor, a power assembly, and a three-phase output assembly are connected to a motor phase line in sequence and arranged in turn. In this structural scheme, although the power assembly close to a heat-dissipation pipeline of the liquid-cooled case can be efficiently cooled, the direct current bus capacitor and the filtration assembly that are far away from the heat-dissipation pipeline of the liquid-cooled case cannot be sufficiently cooled. Thus, the output power of the motor control unit is limited to protect the parts against a thermal failure. Besides, in this arrangement scheme, the motor control unit has a low power density due to its large size.

An objective of the disclosure is to provide a motor control unit, an electric drive assembly, and a vehicle. According to the motor control unit, a heat dissipation capacity of the motor control unit is improved to some extent, a size of the motor control unit is further reduced, and a power density of the motor control unit is at least partially improved.

Figure 7:
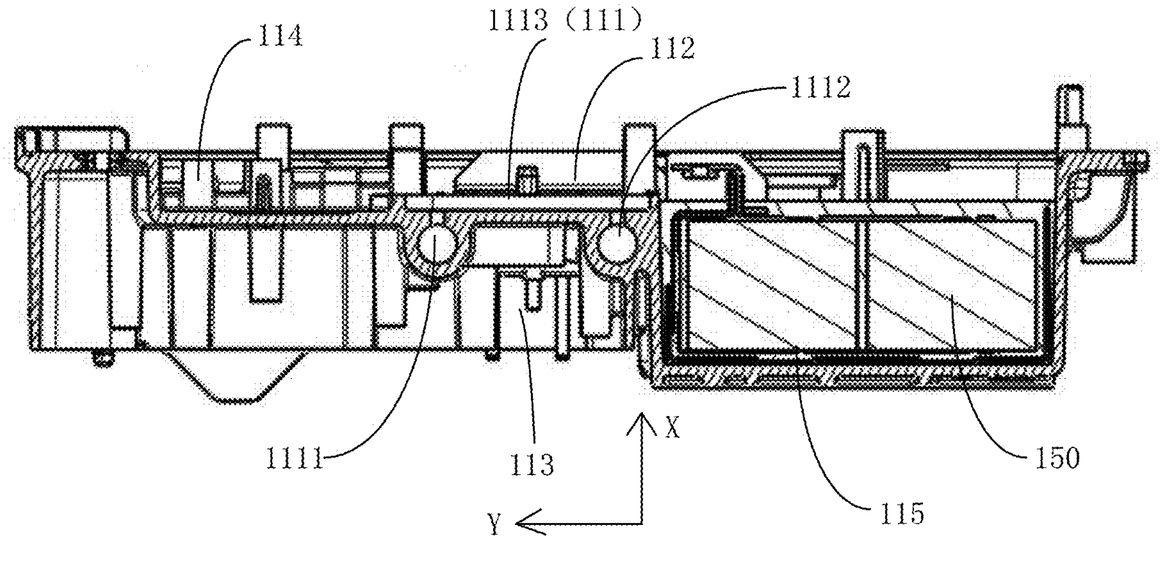
FIG. 7 is a sectional view of a motor control unit according to some examples of the disclosure.

As shown in FIG. 1-FIG. 7, in order to achieve the above objective, a motor control unit 10 is provided according to some examples of the disclosure. The motor control unit 10 includes a cooling assembly 100, a power assembly 120, and a filtration assembly 130. The cooling assembly 100 includes a box 110, the box 110 including a cooling portion 111, a first mounting portion 112, and a second mounting portion 113 (as shown in FIG. 7), and the first mounting portion 112 and the second mounting portion 113 are on two opposite sides, in a first direction X, of the cooling portion 111. A power assembly 120 is mounted at the first mounting portion 112, and a filtration assembly 130 is mounted at the second mounting portion 113, such that the cooling portion 111 is for simultaneous cooling of the power assembly 120 and the filtration assembly 130.

According to the technical solution, the motor control unit 10, according to the disclosure, includes the cooling assembly 100, the power assembly 120, and the filtration assembly 130. The box 110 of the cooling assembly 100 includes the cooling portion 111, and the first mounting portion 112 and the second mounting portion 113 that are arranged at the two opposite sides, in the first direction X, of the cooling portion 111. The power assembly 120 and the filtration assembly 130 are mounted at the first mounting portion 112 and the second mounting portion 113, respectively, such that the cooling portion 111 may simultaneously cool the power assembly 120 and the filtration assembly 130 that are at two sides of the cooling portion. Through this arrangement, the power assembly 120 and the filtration assembly 130 that are in the motor control unit 10 are arranged at the two sides of the cooling portion 111 of the box 110, respectively, so as to be simultaneously cooled. Compared with a solution in the related art in which a power assembly and a filtration assembly are arranged at the same side of a box 110, the technical solution of the disclosure improves a heat dissipation capacity of the motor control unit 10 to some extent, further reduces a size of the motor control unit 10, and at least partially improves a power density of the motor control unit 10.

It should be noted that the box 110 acts as a bearing matrix of other parts of the motor control unit 10; that is, all other parts are mounted on the box 110 to form the motor control unit 10.

In some examples, the box 110 further includes a third mounting portion 114 (as shown in FIG. 7), and the third mounting portion 114 is on a side of the cooling portion 111 in a second direction Y, for example, the third mounting portion 114 may be on a side, in a second direction Y, of the cooling portion 111. The motor control unit 10 further includes a three-phase output assembly 140 within the third mounting portion 114, such that the cooling portion 111 is for the cooling of the three-phase output assembly 140. The third mounting portion 114 and the first mounting portion 112 may be located at the same side of the box 110, and at a lateral side of the cooling portion 111, respectively, such that the cooling portion 111 can simultaneously cool the first mounting portion 112, the second mounting portion 113, and the third mounting portion 114. In this way, a plurality of assemblies of the motor control unit 10 can be simultaneously cooled by using one cooling portion 111.

In some examples, the box 110 further includes a fourth mounting portion 115 (as shown in FIG. 7), and the fourth mounting portion 115 is on the other side of the cooling portion 111, opposite the third mounting portion 114 in the second direction Y. For example, the fourth mounting portion 115 is located at a side, in the second direction Y, and opposite the third mounting portion 114, of the cooling portion 111. The motor control unit 10 further includes a capacitor assembly 150 (as shown in FIG. 7) within the fourth mounting portion 114, such that the cooling portion 111 is for the cooling of the capacitor assembly 150. The first mounting portion 112 and the second mounting portion 113 are located at the two opposite sides, in the first direction X, of the cooling portion 111, and the third mounting portion 114 and the fourth mounting portion 115 are located at the two opposite sides in the second direction Y of the cooling portion, such that the cooling portion 111 can simultaneously cool the first mounting portion 112, the second mounting portion 113, the third mounting portion 114 and the fourth mounting portion 115. In this way, the plurality of assemblies (including the power assembly 120, the filtration assembly 130, the three-phase output assembly 140, and the capacitor assembly 150) of the motor control unit 10 can be simultaneously cooled by one cooling portion 111. In addition, through the above arrangement method, the plurality of assemblies can make better use of a space of the box 110, the space utilization rate can be improved, and miniaturization and weight reduction of the motor control unit 10 can be facilitated.

In some examples, the box 110 further includes the third mounting portion 114 and the fourth mounting portion 115, and the third mounting portion 114 and the fourth mounting portion 115 are located at two opposite sides, in the second direction Y, of the cooling portion 111. The motor control unit 10 further includes the three-phase output assembly 140 and the capacitor assembly 150, the three-phase output assembly 140 is fixedly mounted at the third mounting portion 114, and the capacitor assembly 150 is fixedly mounted at the fourth mounting portion 115, such that the cooling portion 111 can cool the capacitor assembly 150 that is in the fourth mounting portion 115 and the three-phase output assembly 140 that is in the third mounting portion 114 while the cooling portion cools the power assembly 120 that is in the first mounting portion 112 and the filtration assembly 130 that is in the second mounting portion 113. The second direction Y is perpendicular to the first direction X.

In some examples, the filtration assembly 130 is arranged at one side, in the first direction X, of the box 110, and the power assembly 120, the three-phase output assembly 140, and the capacitor assembly 150 are arranged, in the first direction X, at the other side of the box 110. Through the above arrangement, four assemblies are arranged at the periphery of the cooling portion 111, and the size of the motor control unit 10 is reduced conveniently.

As shown in FIG. 7, the cooling portion 111 may be located in a middle area, in the first direction X and the second direction Y, of the box 110. The power assembly 120 is mounted at the first mounting portion 112 above the cooling portion 111, the filtration assembly 130 is mounted at the second mounting portion 113 below the cooling portion 111, the three-phase output assembly 140 is mounted at the third mounting portion 114 at a left side of the cooling portion 111, and the capacitor assembly 150 is mounted at the fourth mounting portion 115 at a right side of the cooling portion 111. That is, the power assembly 120, the filtration assembly 130, the three-phase output assembly 140, and the capacitor assembly 150 are mounted around the cooling portion 111, such that the cooling portion 111 can simultaneously cool the power assembly 120, the filtration assembly 130, the three-phase output assembly 140 and the capacitor assembly 150. In this way, a heat dissipation capacity of the assemblies in the motor control unit 10 is improved, space occupation can be reduced, and the size of the motor control unit 10 can be reduced.

It can be understood that the heat dissipation capacity of the assemblies can be controlled by adjusting a heat exchange area and a distance between each of the power assembly 120, the filtration assembly 130, the three-phase output assembly 140, and the capacitor assembly 150, and the cooling portion 111. For example, in some examples of the disclosure, a maximum heat exchange area and a shortest distance between an assembly that generates much heat (that is, the assembly that needs heat dissipation to the maximum extent) and the cooling portion 111 are guaranteed. A small heat exchange area and a properly long distance between an assembly that generates little heat and the cooling portion 111 are guaranteed. As shown in FIG. 7, since the power assembly 120 and the filtration assembly 130 generate much heat, the power assembly 120 and the filtration assembly 130 are arranged on an upper surface and a lower surface of the cooling portion 111 of the box 110 respectively, and have large heat exchange areas, such that heat dissipation of the power assembly 120 and the filtration assembly 130 is facilitated. Since the three-phase output assembly 140 and the capacitor assembly 150 generate little heat, the three-phase output assembly 140 and the capacitor assembly 150 are arranged at a left side and a right side of the cooling portion 111 respectively, have small heat exchange areas, and have distances from the cooling portion 111 that are longer than a distance between each of the power assembly 120 and the filtration assembly 130 and the cooling portion. In this way, heat dissipation requirements from the three-phase output assembly 140 and the capacitor assembly 150 can be satisfied, and the three-phase output assembly 140 and the capacitor assembly 150 can also be conveniently arranged.

In order to facilitate mounting of the capacitor assembly 150 and further reduce the size of the motor control unit 10, in some examples, the fourth mounting portion 115 is constructed as a recess structure, and the capacitor assembly 150 is potted in the recess structure by a potting adhesive.

The same side of the first mounting portion 112 of the box 110 is provided with the recess structure for accommodating a capacitor core, and the capacitor core pack may be directly potted in the recess structure by a potting adhesive (such as epoxy resin) to form a whole with the box 110. This potting fixing method omits a shell of a direct current bus capacitor and a screw fixing point for mounting to a liquid-cooled case of a traditional capacitor, such that the size and the weight of the motor control unit 10 can be effectively reduced. In addition, since the capacitor core is in direct contact with the box 110, a shell of the traditional capacitor is omitted, a thermal resistance on a heat dissipation path of the capacitor core is reduced and the solution of the motor control unit 10 according to the example of the disclosure can output a higher power without causing an overheating failure of the capacitor core.

As shown in FIGS. 3, 5, 6 and 7, in some examples, the cooling portion 111 includes a liquid inlet pipe 1111, a liquid outlet pipe 1112 and a cooling cavity 1113 connected to the liquid inlet pipe 1111 and the liquid outlet pipe 1112 respectively and provided with an opening on a side, in the first direction X, facing the first mounting portion 112, the power assembly 120 is fixedly mounted at the first mounting portion 112, and the power assembly 120 and the cooling cavity 1113 define a closed space for accommodating a cooling liquid.

The liquid inlet pipe 1111 and the liquid outlet pipe 1112 may extend in a third direction Z and are arranged at an interval in the second direction Y. The cooling cavity 1113 is provided between the liquid inlet pipe 1111 and the liquid outlet pipe 1112 and is provided with the opening facing the first mounting portion 112. After the power assembly 120 is mounted at the first mounting portion 112, a part of side wall (such as a heat dissipation fin) of the power assembly 120 may seal and block the opening, and define, with the cooling cavity 1113, a closed space. A cooling liquid flowing in from the liquid inlet pipe 1111 can directly exchange heat with the power assembly 120 after entering the closed space, and a cooled liquid after heat exchange can flow out from the liquid outlet pipe 1112, such that heat dissipation of the power assembly 120 is implemented.

It should be understood that a wall of one side, in the second direction Y, of that cool cavity 1113 is provided with an inlet in communication with the liquid inlet pipe 1111, and a wall of the other side, in the second direction Y, of the cooling cavity 1113 is provided with an outlet that is opposite the inlet and in communication with the liquid outlet pipe 1112, so as to exchange heat through circulation of the cooling liquid. It can be understood that the inlet and outlet may be constructed as any suitable shape, for example, a strip-shaped hole, or a plurality of small holes provided at intervals in the third direction as long as the cooling liquid can be circulated.

It should be noted that the first direction X, the second direction Y, and the third aspect Z in the example of the disclosure are perpendicular to one another.

As shown in FIG. 7, it can be seen that the first mounting portion 112 and the second mounting portion 113 are located at the two opposite sides, in the first direction X, of the cooling cavity 1113, such that the power assembly 120 and the filtration assembly 130 after being mounted can share the cooling portion 111 (including the cooling cavity 1113, the liquid inlet pipe 1111 and the liquid outlet pipe 1112), which is referred to as a dual-cavity co-cooling technical solution. Through this design solution, when the motor control unit 10 is in a normal operation, the cooling liquid flows through an interior of the box 110, so as to simultaneously cool the power module 121 on the front and the filtration assembly 130 on the back. In this way, a thermal resistance on a heat dissipation path of the filtration assembly 130 is effectively reduced, and the motor control unit 10 of the disclosure can output a higher power without causing an overheating failure of the filtration assembly 130.

Figure 1:
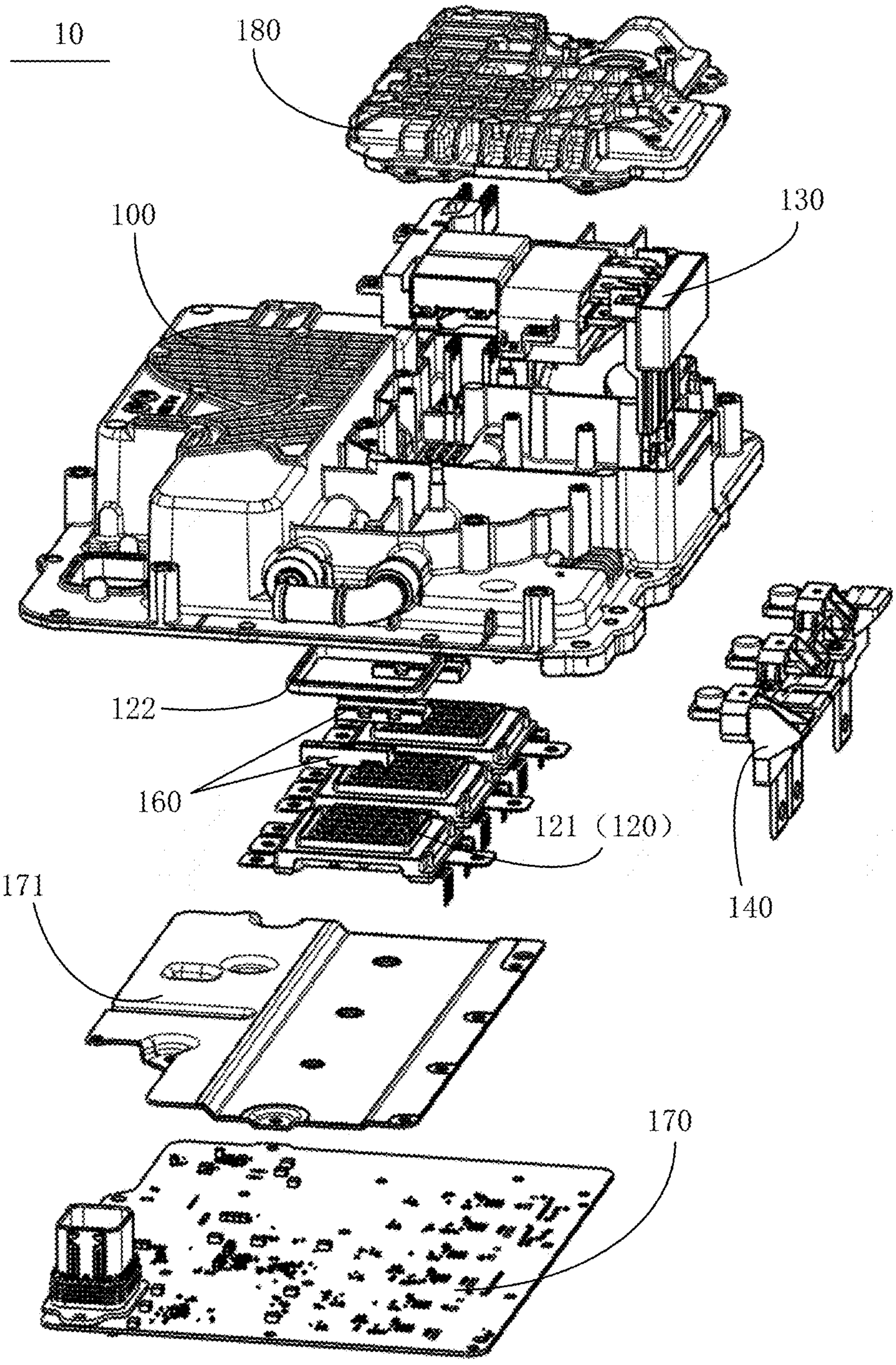
FIG. 1 is an exploded view from a first perspective of a motor control unit according to some examples of the disclosure.

In order to achieve a sealing effect between the power assembly 120 and the cooling cavity 1113, in some examples, as shown in FIGS. 1 and/or 2, the motor control unit 10 further includes a sealing member 122 mounted at a junction of the power assembly 120 and the cooling cavity 1113. The sealing member 122 may be made from rubber and polyurethane that has a sealing function, such as a sealing ring or a sealing strip, and is arranged at the periphery of the opening of the cooling cavity 1113, to implement sealing between the power assembly 120 and the opening. In this way, the influence of leakage of the cooling liquid on the operation of the power assembly 120 is avoided.

In yet another example, the power assembly 120 may include a plurality of power modules 121. The cooling cavity 1113 includes a plurality of sub-cavities 1113*a* spaced between the liquid inlet pipe 1111 and the liquid outlet pipe 1112 and connected to the liquid inlet pipe 1111 and the liquid outlet pipe 1112, respectively. The sub-cavities 1113*a* are in one-to-one correspondence to the power modules 121. Each power module 121 is hermetically mounted in the sub-cavity 1113*a* through one sealing member 122.

Figure 5:
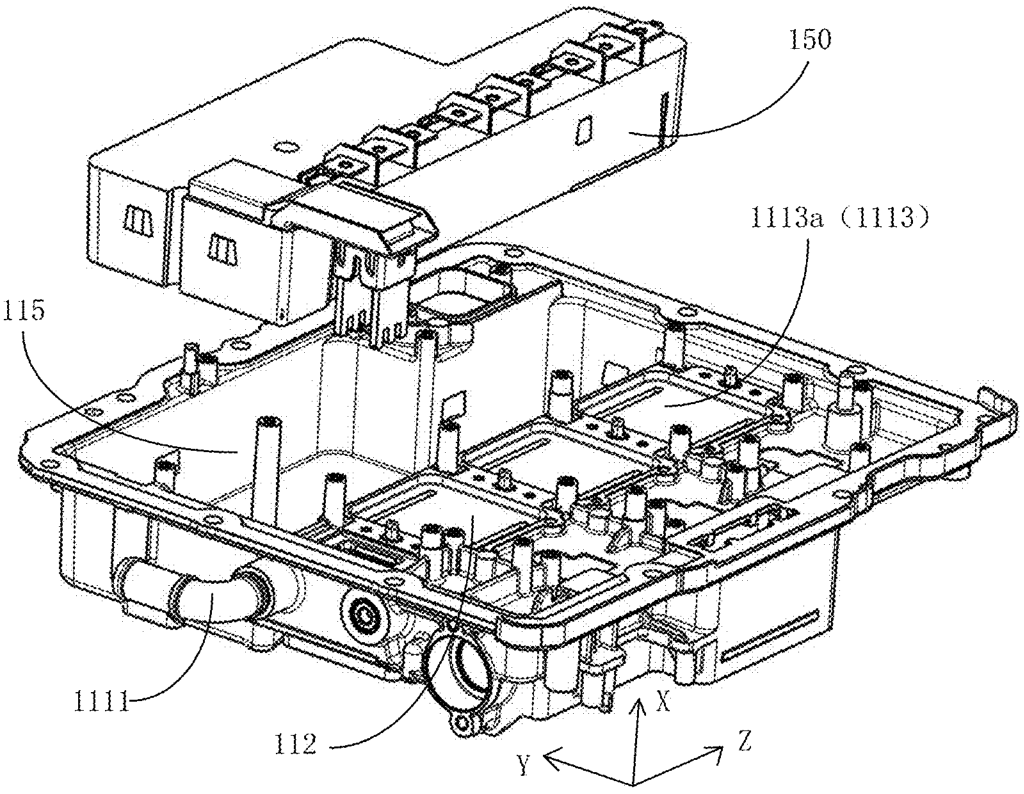
FIG. 5 is a breakdown diagram of a capacitor assembly and a box of a motor control unit according to some examples of the disclosure.
Figure 6:
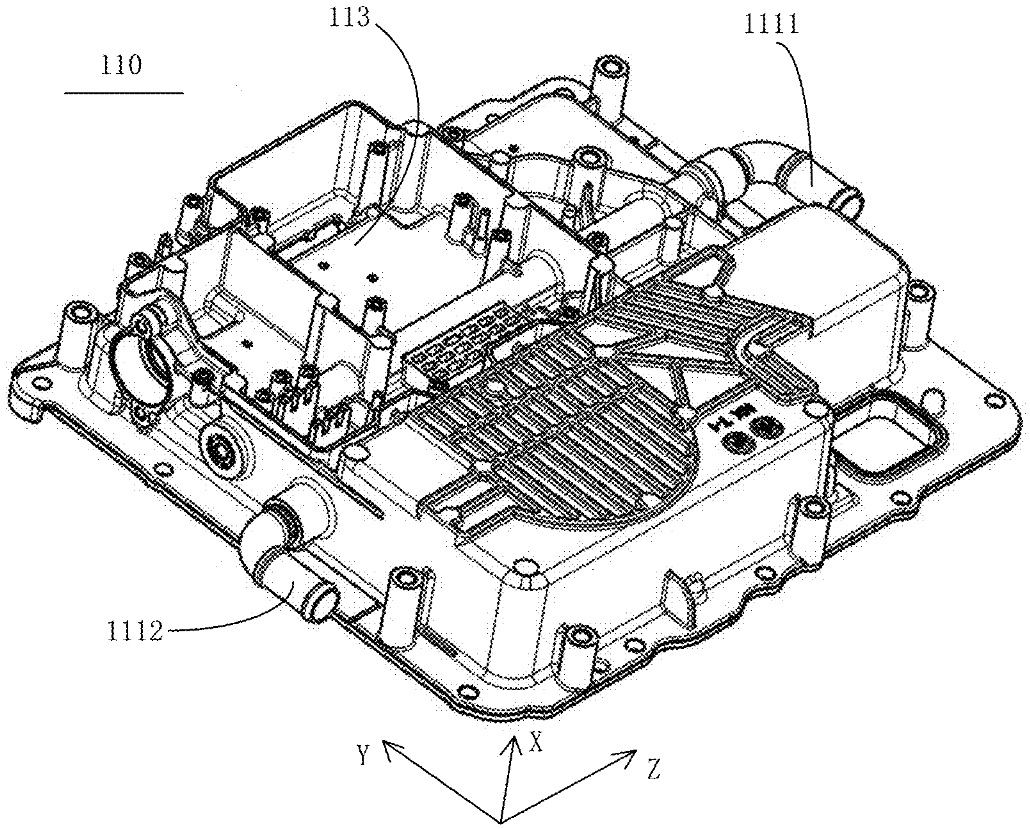
FIG. 6 is a structural diagram of a box of a motor control unit according to some examples of the disclosure.

For example, the power assembly 120 may include three power modules 121, and the cooling cavity 1113 includes three sub-cavities 1113*a* that are provided at intervals in the third direction Z. Two sides, in the second direction Y, of each sub-cavity 1113*a* are in communication with the liquid inlet pipe 1111 and the liquid outlet pipe 1112 respectively, and each power module 121 is hermetically mounted in an opening of the sub-cavity 1113*a* (as shown in FIG. 5) through one sealing member 122 (such as a sealing ring), that is, three cooling sealing spaces arranged at intervals are formed for heat dissipation of the three power modules 121 respectively.

It should be noted that the example of the three power modules 121 and three sub-cavities 1113*a* is illustrative, and the power assembly 120 may also include two, four, or more power modules 121, and a plurality of sub-cavities 1113*a* that are in one-to-one correspondence to the power modules 121 may be provided correspondingly, which will not be repeated here.

In yet another example, the motor control unit 10 further includes fixation press blocks 160, where the fixation press blocks 160 are configured to fixedly mount the plurality of power modules 121 in the sub-cavities 1113*a*. The power module 121 may be fixedly connected to the first mounting portion 112 of the box 110 through the fixation press block 160. For example, the power modules 121 may be fixedly connected to two sides, in the second direction Y, of the sub-cavity 1113*a* of the box 110 through screw or bolt assemblies, and the fixation press block 160 may be pressed in a lateral side of the third direction Z. It can be understood that the fixation press block 160 may be pressed, in the third direction Z, at a side of one power module 121, or between two adjacent power modules 121 for simultaneously pressing two sides of two power modules 121. The fixation press block 160 may be fixedly connected to the box 110 in any proper manner.

In some examples, a mounting hole may be provided in the fixation press block 160, and the first mounting portion 112 of the box 110 may be provided with a screw hole corresponding to the mounting hole. A threaded locking member passes through the mounting hole to be connected into the screw hole, such that a body may be fixed to the box 110, and the power module 121 may be pressed between the fixation press block 160 and the first mounting portion 112. It can be understood that the above mounting form is illustrative, and the fixation press block 160 and the box 110 may also be connected in a snap-fit form, an insertion form, etc., such that the power module 121 may be more closely attached to the sub-cavity 1113*a* with the cooperation of the sealing member 122. In this way, the sealing effect is improved and leakage of the cooling liquid is avoided.

Figure 2:
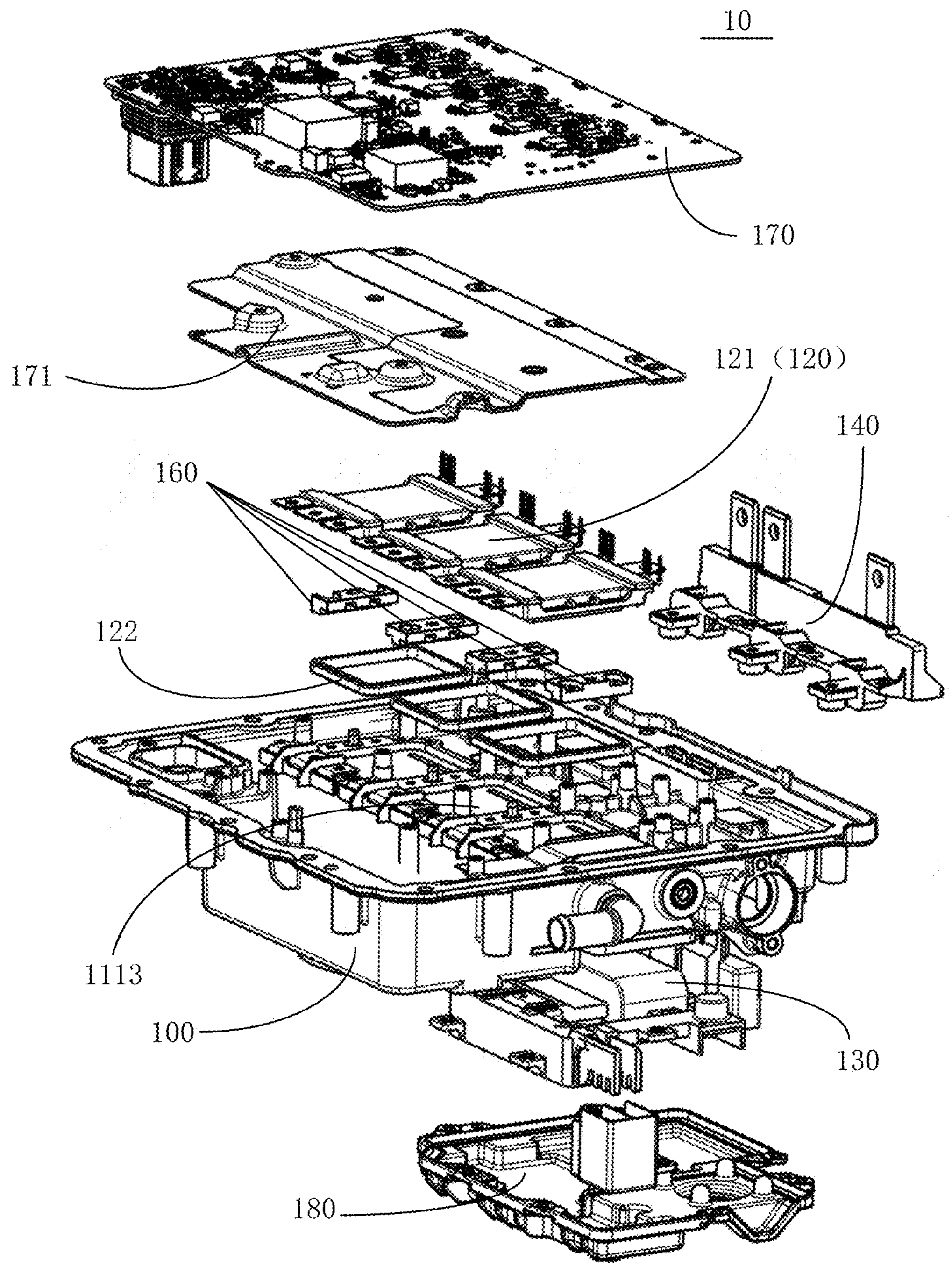
FIG. 2 is an exploded view from a second perspective of a motor control unit according to some examples of the disclosure.

As shown in FIG. 2, the power assembly 120 includes three power modules 121 arranged at intervals in the third direction Z, and four fixation press blocks 160 are arranged. That is, two opposite sides of two adjacent power modules 121 are pressed by one fixation press block 160, and each of outer side edges of two outermost power modules 121 are pressed and fixed by one fixation press block 160, such that the three power modules 121 are fixedly connected to the box 110.

In yet another example, the motor control unit 10 further includes a control circuit board 170 and a shield plate 171, where the control circuit board 170 is arranged at a side, far away from the cooling portion 111, of the power assembly 120 and the shield plate 171 is arranged between the control circuit board 170 and the power assembly 120.

The control circuit board 170 is used for implementing a control function of the motor control unit 10, that is, implementing input/output current/voltage control of the motor control unit 10. The shield plate 171 is fixed to the box 110 between the power assembly 120 and the control circuit board 170, to implement an electromagnetic shielding function and reduce electromagnetic interference in the control circuit board 170 during an operation of the power module 121. It can be understood that the shield plate 171 may be made from any material with an electromagnetic shielding function, for example, the shield plate 171 may be made of metal.

It should be noted that one end of the three-phase output assembly 140 is electrically connected to the power module 121, and the other end of the three-phase output assembly is connected to a phase line of a drive motor, so as to implement current transmission between the motor control unit 10 and the drive motor.

In yet another example, the motor control unit 10 further includes a filtration cover plate 180, where the filtration cover plate 180 is fixedly mounted at the second mounting portion 113 and defines, with the second mounting portion 113, a first accommodation space for accommodating the filtration assembly 130. The filtration assembly 130 is used to filter an input current.

The second mounting portion 113 is located at the other side, opposite the first mounting portion 112, of the cooling portion 111. The second mounting portion 113 may be constructed as a cavity structure, and the filtration assembly 130 is mounted in the cavity structure and sealed by one filtration cover plate 180. After the filtration cover plate 180 is connected to the box 110, the waterproof and dustproof functions of the inner filtration assembly 130 are implemented.

It should be noted that the filtration assembly 130 may be attached to the other side, far away from the opening of the cooling cavity 1113 and in the first direction X, so as to implement heat exchange between the filtration assembly 130 and the cooling liquid in the cooling cavity 1113. It is certain that the filtration assembly 130 may also use the same structure as the above power assembly 120. That is, openings are provided in two sides, in the first direction X, of the cooling cavity 1113, respectively. The power assembly 120 is hermetically mounted above the cooling cavity 1113, and the filtration assembly 130 is hermetically mounted below the cooling cavity. The cooling liquid is introduced into a sealed space defined by the power assembly 120, the cooling cavity 1113, and the filtration assembly 130, so as to cool the power assembly 120 and the filtration assembly 130.

In yet another example, the box 110 further includes a high-voltage input port 116 connected to a battery assembly, a high-voltage output port 117 connected to a drive motor, and a low-voltage signal interface 118 connected to a control circuit board 170; and/or the box 110 further includes a boost wiring harness interface 119, one end of the boost wiring harness interface 119 is connected to the filtration assembly 130, and the other end of the boost wiring harness interface is connected to the battery assembly.

Figure 3:
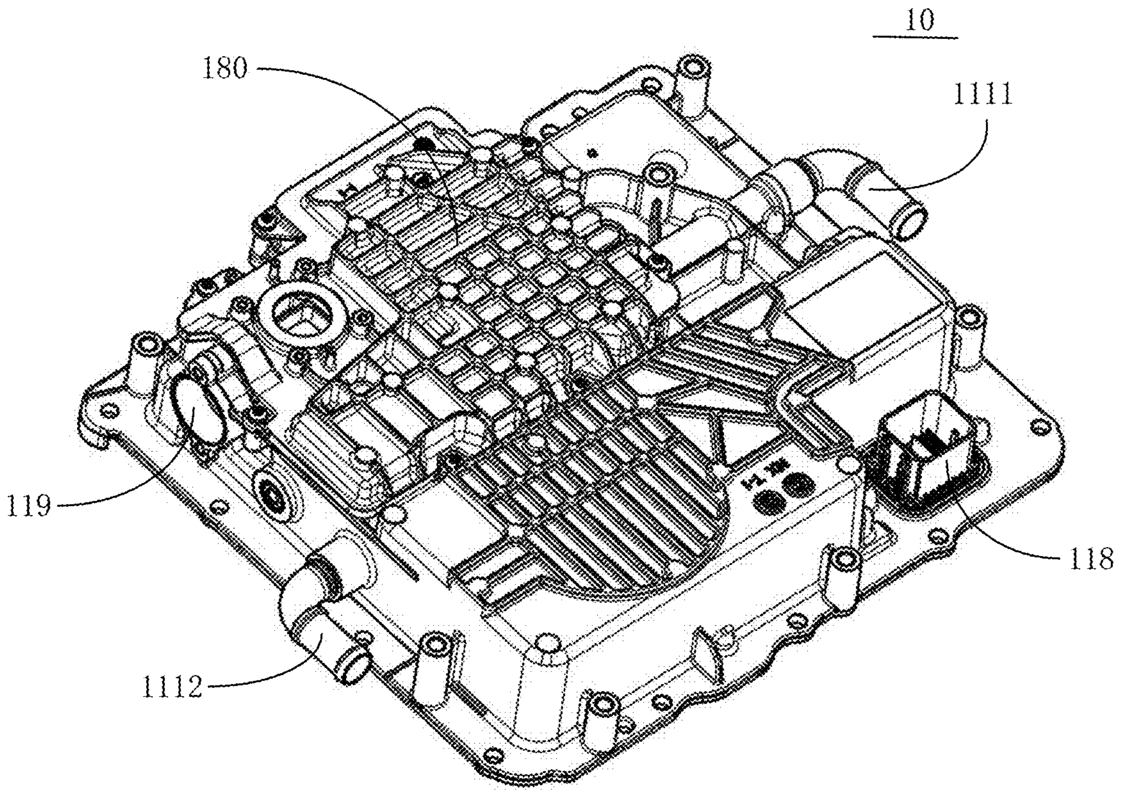
FIG. 3 is a structural diagram of a motor control unit according to some examples of the disclosure.
Figure 4:
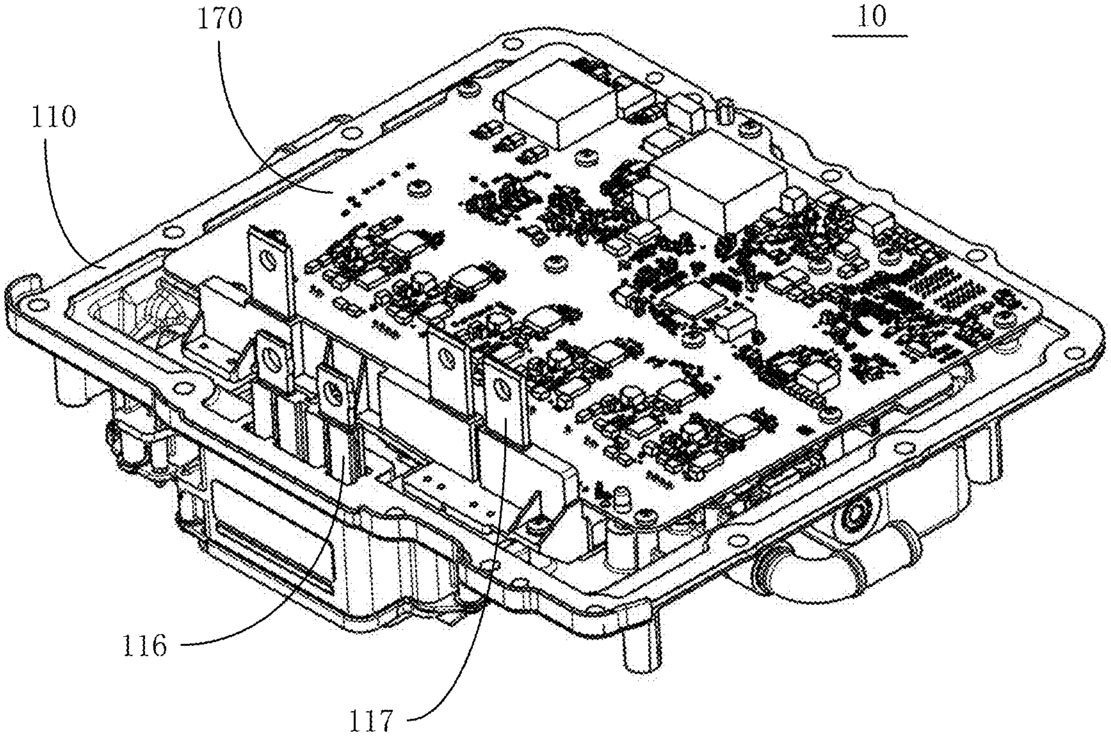
FIG. 4 is a structural diagram from another perspective of a motor control unit according to some examples of the disclosure.

As shown in FIGS. 3 and 4, the high-voltage input port 116 of the motor control unit 10 is connected to the battery assembly, and the high-voltage output port 117 of the motor control unit 10 is connected to the drive motor, and internally connected to the three-phase output assembly 140, and the low-voltage signal interface 118 of the motor control unit 10, so as to implement signal communication between the motor control unit 10 and a vehicle.

In addition, in some examples, the box 110 is further provided with a boost wiring harness interface 119 of the motor control unit 10. That is, the boost wiring harness interface 119 has a boost function, and can implement high-voltage fast charging of an 800 V battery on a common charging pile (400 V).

Figure 8:
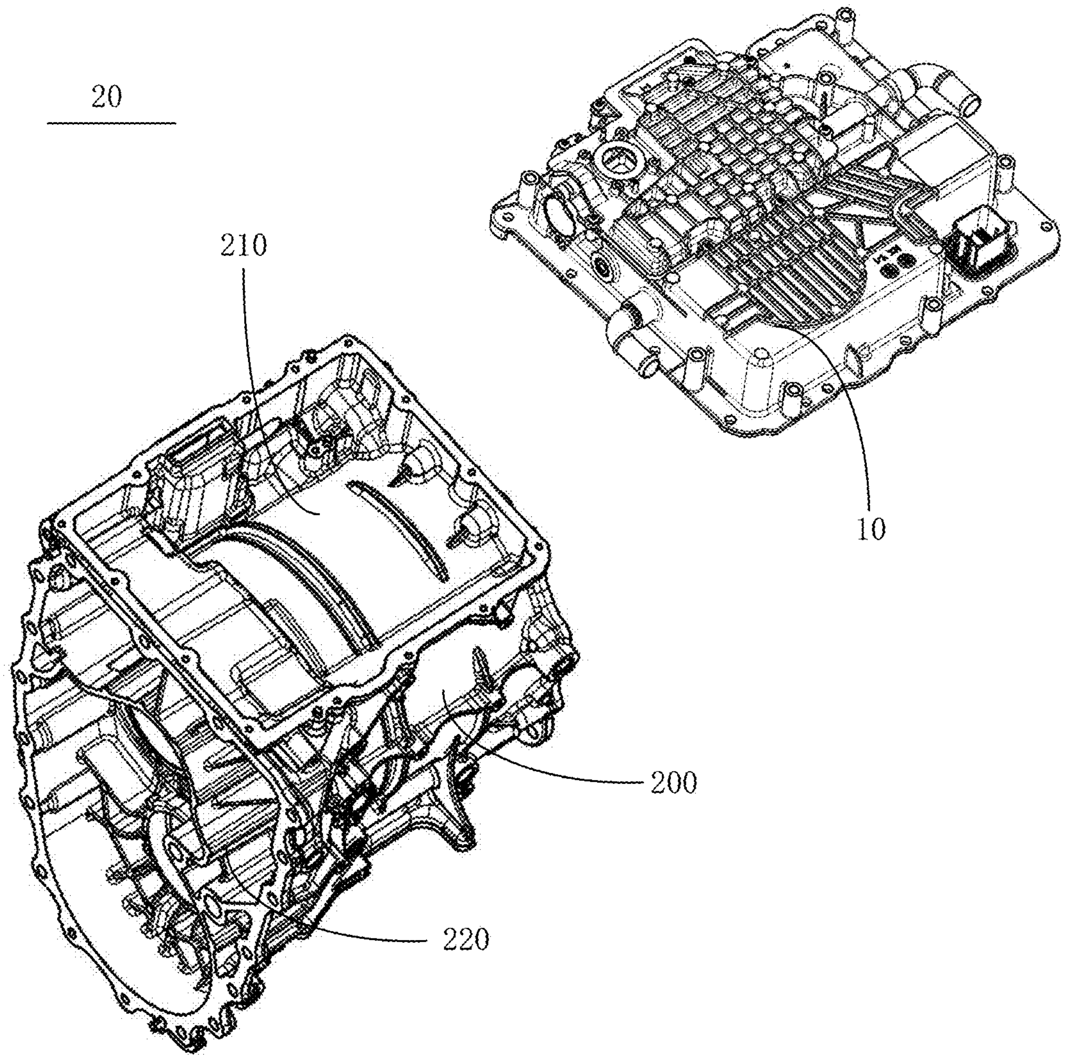
FIG. 8 is a schematic diagram of an exploded view of a motor control unit, and an electric drive housing of an electric drive assembly according to some examples of the disclosure.

As shown in FIG. 8, still another example of the disclosure further provides an electric drive assembly 20. The electric drive assembly 20 includes an electric drive housing 200, a drive motor 220, and the motor control unit 10 described above. The drive motor 220 is mounted in the electric drive housing 200, and the motor control unit 10 is mounted at the electric drive housing 200 for controlling the work of the drive motor 220. As a result, the electric drive assembly 20 also has all the advantages of the motor control unit 10, which will not be repeated here.

In some examples, the electric drive housing 200 includes a mounting cavity 210 that is provided with an opening, a box 110 of the motor control unit 10 is hermetically mounted in the opening of the mounting cavity 210, and the motor control unit 10 and the mounting cavity 210 define a second accommodation space for accommodating a control circuit board 170 and a power assembly 120 of the motor control unit 10.

FIG. 8 is a schematic diagram of an exploded view of a motor control unit 10, and an electric drive housing 200 of an electric drive assembly 20 according to some examples of the disclosure. The electric drive housing 200 is provided with a mounting cavity 210 for mounting the motor control unit 10. When the motor control unit 10 of the example of the disclosure is mounted in the mounting cavity 210 of the electric drive assembly 20, the control circuit board 170 faces an interior of the mounting cavity 210, for example, the control circuit board may be locked on a flange surface of the electric drive housing 200 through peripheral fastening screws, so as to be dustproof and waterproof.

It should be noted that in the electric drive assembly 20 of the disclosure, after the motor control unit 10 is mounted at the electric drive housing 200 of the electric drive assembly 20, the box 110 of the cooling assembly 100 also serves as an upper cover plate of the mounting cavity 210 of the electric drive housing 200. Compared with a traditional electric drive assembly solution, an upper cover plate part of the electric drive assembly is omitted, and a weight of the electric drive assembly 20 is further effectively reduced.

A third aspect of the disclosure further provides a vehicle (not shown). The vehicle includes the electric drive assembly 20 according to the example of the disclosure. As a result, the vehicle also has all the advantages of the described electric drive assembly 20, which will not be repeated here.

According to the motor control unit 10 of the disclosure, the electric drive assembly 20 and the vehicle, the motor control unit 10 includes the cooling assembly 100, the power assembly 120, and the filtration assembly 130. The box 110 of the cooling assembly 100 includes the cooling portion 111, and the first mounting portion 112 and the second mounting portion 113 that are arranged at the two opposite sides, in the first direction X, of the cooling portion 111. The power assembly 120 and the filtration assembly 130 are mounted at the first mounting portion 112 and the second mounting portion 113, respectively, such that the cooling portion 111 may simultaneously cool the power assembly 120 and the filtration assembly 130 that are located at two sides of the cooling portion 111. Through the above arrangement, the power assembly 120 and the filtration assembly 130 that are in the motor control unit 10 are arranged at the two sides of the cooling portion 111 of the box 110, respectively, so as to be simultaneously cooled. Compared with a solution in the related art in which a power assembly and a filtration assembly are arranged at the same side of a box 110, the technical solution of the disclosure improves the heat dissipation capacity of the motor control unit 10 to some extent, further reduces the size of the motor control unit 10, and at least partially improves the power density of the motor control unit 10.

Further, the box 110 is further provided with the third mounting portion 114 and/or the fourth mounting portion 115, and the third mounting portion 114 and the fourth mounting portion 115 are arranged at two opposite sides, in the second direction Y, of the cooling portion 111, respectively. The motor control unit 10 further includes the three-phase output assembly 140 and the capacitor assembly 150, the three-phase output assembly 140 is fixedly mounted at the third mounting portion 114, and the capacitor assembly 150 is potted in the fourth mounting portion 115 by the potting adhesive, such that structures including a mounting housing, a screw, etc. are omitted, the cooling portion 111 can cool at least one of the capacitor assembly 150 and the three-phase output assembly 140. That is, the three-phase output assembly 140 and the capacitor assembly 150 are arranged at the two opposite sides, in the second direction Y, of the cooling portion 111 respectively, such that the heat dissipation capacity of the capacitor assembly 150 is further improved and the size and the weight of the motor control unit 10 are further reduced.

The preferred embodiments of the disclosure have been described above in detail with reference to the accompanying drawings, but the disclosure is not limited to the specific details in the above embodiments. Various simple modifications can be made to the technical solution of the disclosure within the technical concept of the disclosure, and these simple modifications should all fall within the protection scope of the disclosure.

In addition, it should be noted that the specific technical features described in the above specific embodiments can be combined in any suitable way without contradiction, and various possible combinations will not be described otherwise in the disclosure for avoiding unnecessary repetition.

In addition, various embodiments of the disclosure can also be arbitrarily combined, and the combinations should also be regarded as the contents in the disclosure as long as they do not violate the idea of the disclosure.

Embodiments

A first embodiment provides a motor control unit. The motor control unit includes: a cooling assembly including a box, the box including a cooling portion, a first mounting portion and a second mounting portion, the first mounting portion being on a side of the cooling portion in a first direction, and the second mounting portion being on the other side of the cooling portion opposite the first mounting portion in the first direction; and a power assembly and a filtration assembly, the power assembly being on the first mounting portion, and the filtration assembly being on the second mounting portion, such that the cooling portion being for simultaneous cooling of the power assembly and the filtration assembly.

A second embodiment includes a motor control unit of the first embodiment, wherein the box further includes a third mounting portion; and the third mounting portion is on a side of the cooling portion in a second direction, and the motor control unit further includes a three-phase output assembly within the third mounting portion, such that the cooling portion is for the cooling of the three-phase output assembly.

A third embodiment includes a motor control unit of the first and/or the second embodiment, wherein the box further includes a fourth mounting portion, and the fourth mounting portion is on the other side of the cooling portion opposite the third mounting portion in the second direction; and the motor control unit further includes a capacitor assembly within the fourth mounting portion, such that the cooling portion is for the cooling of the capacitor assembly.

A fourth embodiment includes a motor control unit of the third embodiment, wherein the first mounting portion, the third mounting portion, and the fourth mounting portion are on a side of the box in the first direction, and the second mounting portion is on the other opposite side of the box in the first direction.

A fifth embodiment includes a motor control unit of the third embodiment, wherein the fourth mounting portion is constructed as a recess structure, and the capacitor assembly is potted in the recess structure by a potting adhesive.

A sixth embodiment includes a motor control unit of the first embodiment, wherein the cooling portion includes a liquid inlet pipe, a liquid outlet pipe and a cooling cavity connected to the liquid inlet pipe and the liquid outlet pipe respectively and provided with an opening on a side facing the first mounting portion, the power assembly is fixedly mounted at the first mounting portion, and the power assembly and the cooling cavity define a closed space for accommodating a cooling liquid.

A seventh embodiment includes a motor control unit of the sixth embodiment, wherein the motor control unit further includes a sealing member mounted at a junction of the power assembly and the cooling cavity.

A eighth embodiment includes a motor control unit of the sixth embodiment, wherein the power assembly includes a plurality of power modules; the cooling cavity including a plurality of sub-cavities spaced between the liquid inlet pipe and the liquid outlet pipe and connected to the liquid inlet pipe and the liquid outlet pipe respectively, and the sub-cavities are in one-to-one correspondence to the power modules; and each power module is hermetically mounted in the sub-cavity through one sealing member.

A ninth embodiment includes a motor control unit of the eighth embodiment, wherein the motor control unit further includes fixation press blocks, where the fixation press blocks are configured to fixedly mount the plurality of power modules in the sub-cavities.

A tenth embodiment includes a motor control unit of the first embodiment, wherein the motor control unit further includes a control circuit board and a shield plate, where the control circuit board is arranged at a side, far away from the cooling portion, of the power assembly, and the shield plate is arranged between the control circuit board and the power assembly.

An eleventh embodiment includes a motor control unit of the first embodiment, wherein the motor control unit further includes a filtration cover plate, where the filtration cover plate is fixedly mounted at the second mounting portion and defines, with the second mounting portion, a first accommodation space for accommodating the filtration assembly.

A twelfth embodiment includes a motor control unit of the first embodiment, wherein the box further includes a high-voltage input port connected to a battery assembly, a high-voltage output port connected to a drive motor, and a low-voltage signal interface that is connected to a control circuit board; and/or the box further includes a boost wiring harness interface, one end of the boost wiring harness interface is connected to the filtration assembly, and the other end of the boost wiring harness interface is used to connect to the battery assembly.

A thirteenth embodiment provides an electric drive assembly. The electric drive assembly includes an electric drive housing and the motor control unit according to any one of the first to twelfth embodiments.

A fourteenth embodiment includes an electric drive assembly of the thirteenth embodiment, wherein the electric drive housing includes a mounting cavity that is provided with an opening, a box of the motor control unit is hermetically mounted in the opening of the mounting cavity, and the motor control unit and the mounting cavity define a second accommodation space for accommodating a control circuit board and a power assembly of the motor control unit.

The invention claimed is:

1. A motor control unit, comprising:

a cooling assembly comprising a box, the box comprising a cooling portion, a first mounting portion and a second mounting portion, the first mounting portion being on a side of the cooling portion in a first direction, and the second mounting portion being on an other side of the cooling portion opposite the first mounting portion in the first direction;

a power assembly being on the first mounting portion; and a filtration assembly being on the second mounting portion, the cooling portion being for simultaneous cooling of the power assembly and the filtration assembly;

wherein the box comprises a third mounting portion, the third mounting portion is on a side of the cooling portion in a second direction, and the motor control unit further comprises a three-phase output assembly within the third mounting portion, the cooling portion is for the cooling of the three-phase output assembly;

wherein the box comprises a fourth mounting portion, the fourth mounting portion is on the other side of the cooling portion opposite the third mounting portion in the second direction; and the motor control unit further comprises a capacitor assembly within the fourth mounting portion, the cooling portion is for the cooling of the capacitor assembly; and wherein the first mounting portion, the third mounting portion and the fourth mounting portion are on a side of the box in the first direction, and the second mounting portion is on the other opposite side of the box in the first direction.

2. The motor control unit according to claim 1, wherein the fourth mounting portion is constructed as a recess structure, and the capacitor assembly is potted in the recess structure by a potting adhesive.

3. The motor control unit according to claim 1, wherein the cooling portion comprises a liquid inlet pipe, a liquid outlet pipe and a cooling cavity connected to the liquid inlet pipe and the liquid outlet pipe respectively and provided with an opening on a side facing the first mounting portion, the power assembly is fixedly mounted at the first mounting portion, and the power assembly and the cooling cavity define a closed space for accommodating a cooling liquid.

4. The motor control unit according to claim 3, further comprising a sealing member mounted at a junction of the power assembly and the cooling cavity.

5. The motor control unit according to claim 3, wherein the power assembly comprises a plurality of power modules;

the cooling cavity comprising a plurality of sub-cavities spaced between the liquid inlet pipe and the liquid outlet pipe and connected to the liquid inlet pipe and the liquid outlet pipe respectively, and the sub-cavities are in one-to-one correspondence to the power modules; and each power module is hermetically mounted in the sub-cavity through one sealing member.

6. The motor control unit according to claim 5, the motor control unit further comprising a fixation press blocks, wherein the fixation press blocks are configured to fixedly mount the plurality of the power modules in the sub-cavities.

7. The motor control unit according to claim 1, the motor control unit further comprising a control circuit board and a shield plate, wherein the control circuit board is arranged at a side, far away from the cooling portion, of the power assembly, and the shield plate is arranged between the control circuit board and the power assembly.

8. The motor control unit according to claim 1, the motor control unit further comprising a filtration cover plate, wherein the filtration cover plate is fixedly mounted at the second mounting portion and defines, with the second mounting portion, a first accommodation space for accommodating the filtration assembly.

9. The motor control unit according to claim 1, wherein the box further comprises a high-voltage input port connected to a battery assembly, a high-voltage output port connected to a drive motor, and a low-voltage signal interface connected to a control circuit board; and the box further comprises a boost wiring harness interface, one end of the boost wiring harness interface is connected to the filtration assembly, and the other end of the boost wiring harness interface is used to connect to the battery assembly.

10. The motor control unit according to claim 1, wherein the motor control unit further comprising a filtration cover plate, wherein the filtration cover plate is fixedly mounted at the second mounting portion and defines, with the second mounting portion, a first accommodation space for accommodating the filtration assembly.

11. The motor control unit according to claim 1, wherein the box further comprises a high-voltage input port connected to a battery assembly, a high-voltage output port connected to a drive motor, and a low-voltage signal interface connected to a control circuit board; and the box further comprises a boost wiring harness interface, one end of the boost wiring harness interface is connected to the filtration assembly, and the other end of the boost wiring harness interface is used to connect to the battery assembly.

12. An electric drive assembly, comprising an electric drive housing and a motor control unit;

the motor control unit comprising:

a cooling assembly comprising a box, the box comprising a cooling portion, a first mounting portion and a second mounting portion, the first mounting portion being on a side of the cooling portion in a first direction, and the second mounting portion being on an other side of the cooling portion opposite the first mounting portion in the first direction;

a power assembly being on the first mounting portion; and a filtration assembly being on the second mounting portion, the cooling portion being for simultaneous cooling of the power assembly and the filtration assembly;

wherein the box further comprises a third mounting portion; and the third mounting portion is on a side of the cooling portion in a second direction, and the motor control unit further comprises a three-phase output assembly within the third mounting portion, the cooling portion is for the cooling of the three-phase output assembly;

wherein the box further comprises a fourth mounting portion, and the fourth mounting portion on the other side of the cooling portion opposite the third mounting portion in the second direction; and the motor control unit further comprises a capacitor assembly within the fourth mounting portion, the cooling portion is for the cooling of the capacitor assembly; and wherein the first mounting portion, the third mounting portion and the fourth mounting portion are on a side of the box in the first direction, and the second mounting portion is on the other opposite side of the box in the first direction.

13. The electric drive assembly according to claim 12, wherein the electric drive housing comprises a mounting cavity comprising an opening, a box of the motor control unit hermetically mounted on the opening of the mounting cavity, and the motor control unit and the mounting cavity defining a second accommodation space for accommodating a control circuit board and a power assembly of the motor control unit.

14. The electric drive assembly according to claim 12, wherein the fourth mounting portion is constructed as a recess structure, and the capacitor assembly is potted in the recess structure by a potting adhesive.

15. The electric drive assembly according to claim 12, wherein the motor control unit further comprises a filtration cover plate, the filtration cover plate being fixedly mounted at the second mounting portion and being defined, with the second mounting portion, a first accommodation space for accommodating the filtration assembly.

16. The electric drive assembly according to claim 12, wherein the cooling portion comprises a liquid inlet pipe, a liquid outlet pipe and a cooling cavity connected to the liquid inlet pipe and the liquid outlet pipe respectively and provided with an opening on a side facing the first mounting portion, the power assembly is fixedly mounted at the first mounting portion, and the power assembly and the cooling cavity define a closed space for accommodating a cooling liquid.

17. The electric drive assembly according to claim 12, wherein the motor control unit further comprising a control circuit board and a shield plate, wherein the control circuit board is arranged at a side, far away from the cooling portion, of the power assembly, and the shield plate is arranged between the control circuit board and the power assembly.

18. A vehicle comprising an electric drive assembly;

the electric drive assembly comprising an electric drive housing and a motor control unit;

the motor control unit comprising:

a cooling assembly comprising a box, the box comprising a cooling portion, a first mounting portion and a second mounting portion, the first mounting portion being on a side of the cooling portion in a first direction, and the second mounting portion being on an other side of the cooling portion opposite the first mounting portion in the first direction;

a power assembly being on the first mounting portion; and a filtration assembly being on the second mounting portion, the cooling portion being for simultaneous cooling of the power assembly and the filtration assembly;

wherein the box comprises a third mounting portion, the third mounting portion is on a side of the cooling portion in a second direction, and the motor control unit further comprises a three-phase output assembly within the third mounting portion, the cooling portion is for the cooling of the three-phase output assembly;

wherein the box comprises a fourth mounting portion, the fourth mounting portion is on the other side of the cooling portion opposite the third mounting portion in the second direction; and the motor control unit further comprises a capacitor assembly within the fourth mounting portion, the cooling portion is for the cooling of the capacitor assembly; and wherein the first mounting portion, the third mounting portion and the fourth mounting portion are on a side of the box in the first direction, and the second mounting portion is on the other opposite side of the box in the first direction.

19. The electric drive assembly according to claim 18, wherein the electric drive housing comprises a mounting cavity comprising an opening, a box of the motor control unit hermetically mounted on the opening of the mounting cavity, and the motor control unit and the mounting cavity defining a second accommodation space for accommodating a control circuit board and a power assembly of the motor control unit.

20. The electric drive assembly according to claim 16, wherein the power assembly comprises a plurality of power modules;

the cooling cavity comprising a plurality of sub-cavities spaced between the liquid inlet pipe and the liquid outlet pipe and connected to the liquid inlet pipe and the liquid outlet pipe respectively, and the sub-cavities are in one-to-one correspondence to the power modules; and each power module is hermetically mounted in the sub-cavity through one sealing member.

* * * * *